May 7, 1935.  L. T. M. RALSTON ET AL  2,000,455
ELECTRICAL HEATING DEVICE
Filed April 27, 1931   2 Sheets-Sheet 1
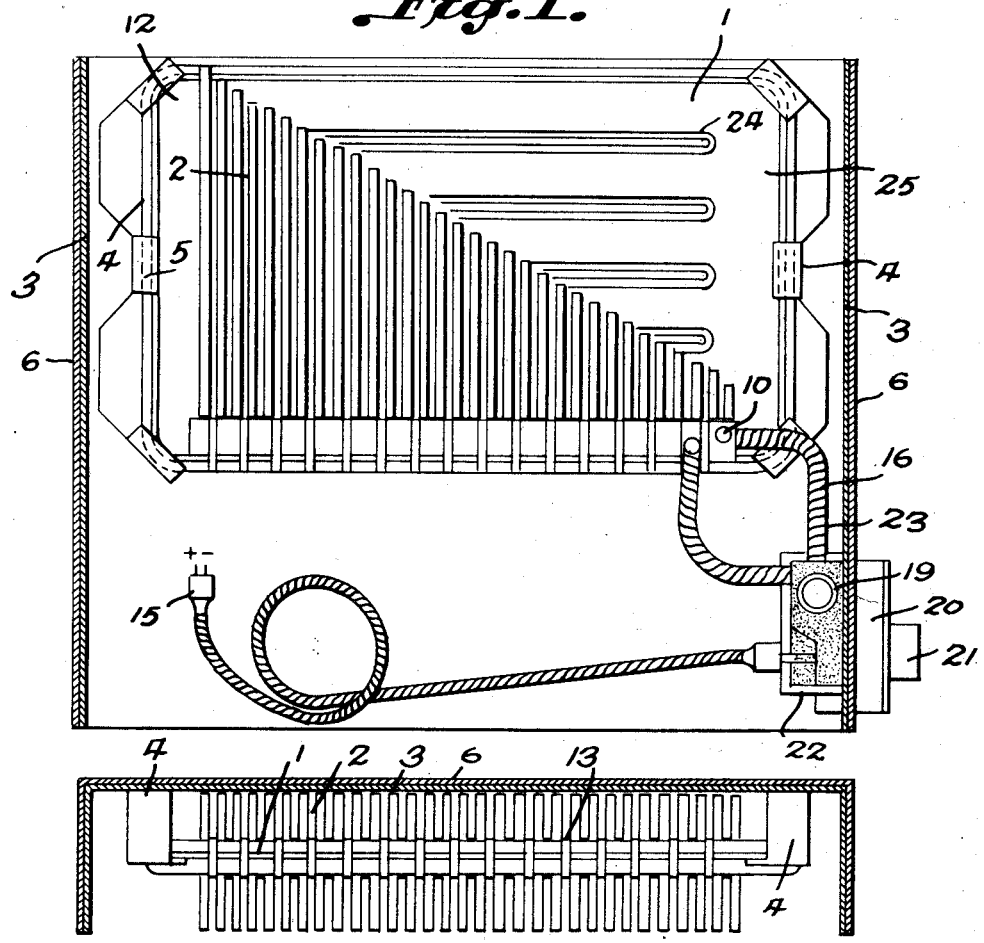
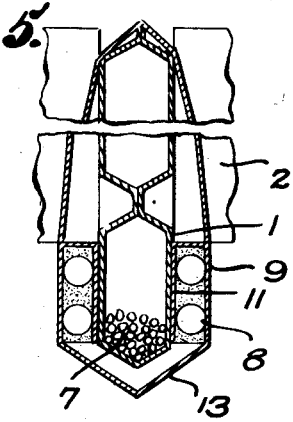
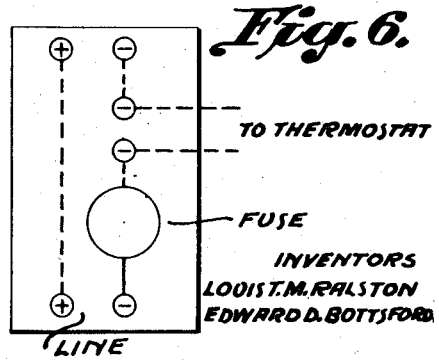
INVENTORS
LOUIS T. M. RALSTON
EDWARD D. BOTTSFORD
BY
ATTORNEY May 7, 1935.  L. T. M. RALSTON ET AL  2,000,455
ELECTRICAL HEATING DEVICE
Filed April 27, 1931   2 Sheets-Sheet 2

INVENTORS
LOUIS T. M. RALSTON
EDWARD D. BOTTSFORD
BY
ATTORNEY

Patented May 7, 1935

2,000,455

UNITED STATES PATENT OFFICE 2,000,455

ELECTRICAL HEATING DEVICE

Louis T. M. Ralston and Edward D. Bottsford, New York, N. Y., assignors to Chelva Heat Inc., Newark, N. J., a corporation of Delaware Application April 27, 1931, Serial No. 533,126

6 Claims. (Cl. 219—38)

This invention is in part a continuation of our co-pending application for Electrical heating device bearing Serial No. 519,755, in which said co-pending application we disclose the same general structure and device as herein described, except, that in the within specifications we disclose and claim a modification in the type of external electrical heating element, a more detailed explanation and claims relative to the advantages of our use of a low heat volatile solid chemical, whose characteristics are such that during any and all workable temperatures encountered with our apparatus there can be no possible structural rupture due to vapor pressure, inasmuch as our vapor pressures during workable temperatures are not above atmospheric pressures. Moreover, in the within disclosures, we provide a method for manufacture of the device in connection with the creation of a partial vacuum within the container by preheating the chemical vapor, and then hermetically sealing the container.

Moreover, it is our present object to provide apparatus which will maintain a minimum temperature gradient between the floor and the ceiling of a room or space by means of the characteristics disclosed and with respect to the location and operation of our thermostatic control. It is our further object to provide for the safe operation by reason of the limited pressures within the container structure not only by the inherent nature of the chemical which we employ as our heat absorbing and transferring means but the additional object of proportioning the amount of said chemical to the cubical contents of the container by definite ratios by volume and likewise by properly proportioning the surfaces in contact with the ambient air so as to guarantee and insure the flow of heat from the interior of the container structure to the exterior surfaces thereof at a predetermined rate. Also we intend to additionally provide for safe limitation of temperature and pressure, within the container, by the design and proportioning of the fins or secondary structure, which are in contact with the ambient air, so as to cause said air to move through and from the flues or channels formed by said fins etc., at velocity controlled both by the area and length of said flues, as by the other limitations heretofore expressed. In this regard, we have considered not only the heat derived by convection from the device but also the heat of radiation. We intend that the air in the flues will intimately contact with the heated metal surfaces of the flues and container thus wiping off said surfaces and carrying off the heat generated in the container structure and transmitted to the secondary structure 2 at rates determined by the temperatures of the incoming air at the bases of said secondary structures which is likewise and simultaneously effected with respect to the thermostatic control means provided so that this incoming air likewise controls the prime source of heat energy. In general, we likewise accomplish the other objects set out in our said co-pending application, especially for domestic hot water heaters and cooking ranges and cooking utensils, as well as other types of domestic and industrial heating devices.

Our invention will be more readily understood by reference to the attached drawings in which like numbers refer to like parts in the several views.

Fig. 1 shows a diagrammatic illustration in elevation of a preferred embodiment of our invention as applied to room or space heating units.

Fig. 2 shows a plan view of the same.

Fig. 5 shows a partial sectional view of the container structure with the chemical therein, and the method of attaching the heat source elements and of supporting the same.

Fig. 6 shows a diagrammatic layout of the wiring within the combination receptacle block when unit is functioning from an electrical source.

Figure 7:
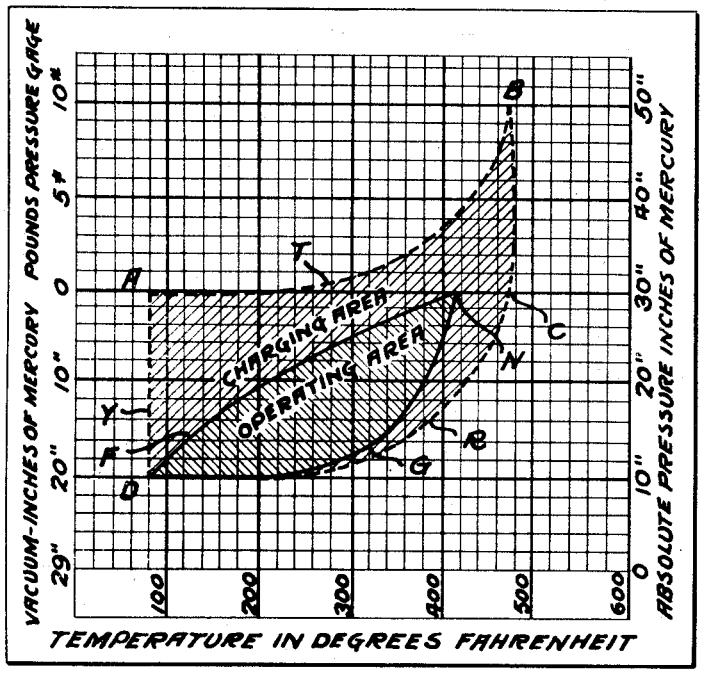
Fig. 7 shows a graph delineating the characteristics of the chemical under the conditions of charging and of operating the unit.
Figure 4:
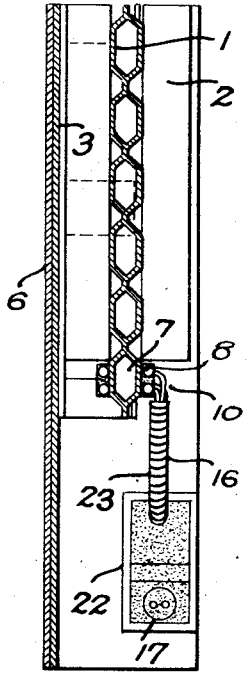
Fig. 4 shows a cross sectional view of the same.

In the drawings we show at Fig. 1, a non-ferrous light weight metal container 1, formed to resemble a conventional radiator section, provided with a plurality of tubular passages or channels 24 which merge into the end chambers 25 so that a means of a cycle of circulation of the hot vapor emitted by the low heat volatile solid chemical 7 is thus provided within the container structure 1.

Attached to the sides of the container structure 1 are a plurality of thin nonferrous metal sheets, strips or fins 2 so shaped and disposed as to form flues or channels and so proportioned as to cause the air to pass through at a definite velocity and to intimately contact and wipe the surface of these flues and the container structure.

A metallic contact is made between these flues 2 and the container structure 1 by welding, brazing, clamping or other means.

It is understood that while we show this as a preferred embodiment of our invention for room and space heating, we may attach other forms of metallic structure to the container 1, or we may vary the form and shape of the container 1, as for domestic, industrial or process heating devices.

We prefer to place within the container 1 a quantity of low heat volatile solid chemical 7, in the proportions of one to twenty by volume of the chemical to the cubic contents of the container structure 1.

It is to be understood that while we designate this proportion or ratio of chemical to the contents of the container, in this as a preferred embodiment of our invention, we may vary the said ratio in accordance with the conditions of demand or of structure as for domestic, industrial or process heating.

In this embodiment of our invention, we induce a vacuum of twenty inches of mercury column within the container structure 1 and maintain an operating pressure range of between one inch and twenty inches of vacuum measured in inches of mercury column below atmosphere within the container. We propose, when charging the container 1, to build up a pressure of ten pounds per square inch above atmosphere within the container 1, and to then expel the air until the internal pressure is at atmosphere when the container 1 is hermetically sealed at the orifice 12. As the temperatures decrease within the container 1, the temperature of the metallic structure is reduced until the chemical vapor is condensed and deposited uniformly upon the internal surfaces of the container 1, forming a film thereon and inducing a partial vacuum within the container 1. When an operating temperature range of between seventy degrees and four hundred and ninety-two degrees Fahrenheit is maintained within the container 1 with chemical 7 in film contact with the container walls, they will be at a sufficiently high temperature to quickly volatilize the chemical.

It is to be understood that while we designate these temperatures and pressures, in this as a preferred embodiment of our invention, we may vary the temperatures or the pressures as for domestic, industrial or process heating.

Along the lower portion of the container 1, in this embodiment of our invention, we attach one or more electrical heat source elements 8, which are of the resistance type, consisting of nichrome or other high electrical resistance wire, helically wound and embedded in magnesium oxide or other electrical insulating compound, the whole contained in a metallic sheath.

The heat source elements 8 are in metallic contact with the container structure 1 by means of the contact metal 11, which is an alloy of basic metals in such proportions as to provide a means of maintaining the metallic contact between the container structure 1 and the heat source element 8, thus insuring the maximum heat transfer and at the same time provides a means of allowing the heat source element 8 to be removed, replaced or changed without destroying the contact surfaces. We may, however, braze or weld these elements 8 to the container 1 but by the above construction the elements 8 may be removed, replaced or changed in the field without the use of factory equipment.

On the outer surfaces of the element 8 which are not in contact with the container 1 asbestos or micalite insulators 9 are provided, thus preventing wasteful radiation of heat energy from the element 8, although in designing the proportions of the device such radiation as is certain to occur at this point is taken into consideration. The insulators 9 are secured in place with the elements 8 by means of the binders 13, which are thin narrow strips of nonferrous metal and which completely encircle the container structure 1 and the heat source elements 8.

The surface temperature of the metallic element 8 can be regulated and/or limited by varying the gauge of the resistance wire and of the spacing between the coils of the helix or by inserting between the coils of said helix and wound concentrically therewith a spiral of enamelled wire not electrically connected. We prefer to regulate and limit the surface temperature of the sheath to a temperature not in excess of 750 degrees Fahrenheit and to regulate and proportion the spacing and gauge of the resistance wire so as to give a wattage input not in excess of forty watts per square inch of contact surface between container 1 and element 8.

From each end of the resistance wire helix a conductor of low electrical resistance metal is carried through the metallic sheath to the exterior surface thereof. The penetration of said sheath surface is electrically protected by mica insulation, and we provide at each of the aforesaid terminals protection from electric short circuiting by means of mica, bakelite or composition protectors 10, which are so designed and constructed as to permit of the ready and easy attachment or disconnecting of wires in the field without the use of factory equipment.

One terminal 10 of the heat source elements 8 is connected through underwriters approved slow burning wire connector 16 to a terminal of the thermelectric relay 20 which consists of a single pole circuit breaker. The other terminal of the said thermelectric relay 20 is connected through underwriters approved slow burning wire connector 16 to one terminal of the combination receptacle and fuse block 17. One terminal 10 of the heat source element 8 is connected through underwriters approved slow burning wire 16, incased in metallic flexible tubing 23, with a terminal of the combination receptacle and fuse block 17. The wires in the fuse block 17 are provided and arranged as shown at Fig. 6 on the drawings. The combination block 17 is also provided with male or bayonet type terminal for the connection of the flexible service connector 15. The whole combination 17 is included in the enclosure 22. The movement of the single pole circuit breaker 20 is actuated by the functioning of the adjustable thermostat 21 and the functioning of the adjustable thermostat 21 is controlled by the temperature of the ambient air.

In this embodiment of our invention we locate the adjustable thermostat 21 in such position on the unit that it will be in the path of the entering or incoming air passing to or through the unit, or in such position that it will be in the lowest and coolest strata of air in the room or space, but not too close to the metallic portions to make control difficult or inaccurate.

It is to be understood that while we show this as a preferred embodiment of our invention for unit or individual installation, we may in the case of a multiplicity of units in a space under the same temperature conditions omit the thermelectric relay 20—21 from each unit and locate the relay 20—21 elsewhere making the electrical connections with suitable wiring. It is to be understood also that we may vary the location and also the design of the thermelectric relay 20—21 as for domestic, industrial or process heating.

We provide a connection between the electric service wires and the combination block 17 through flexible all rubber cord set 15 made up of braided or stranded copper wire encased with heavy moulded rubber, one end provided with a moulded rubber cap bayonet type and the other end provided with moulded rubber cap female type.

We provide a metallic casing or support 3 which encloses the container structure 1 together with the secondary structure 2 and which supports the thermelectric relay 20—21 and the combination block 17. This casing is open at top and bottom so that the air directed through the flues or channels of the secondary structure 2 enters at the bottom thereof and passes out at the top, becoming heated during such passage. The loss of heat through the casing 3 is prevented by means of the insulation 6 which is made up of asbestos fiber in sheets. We can substitute, in lieu of the asbestos fiber, when desired, molded micalite or other heat resisting material. We support and hold the container and finned structures 1—2 in place in the casing 3 by the supports 4—5 which are integral parts of the casing 3.

We prefer in this embodiment of our invention to locate the assembled unit in inclosures of various styles, types and materials which are provided with inlet and outlet openings for ingress, egress and circulation of the air, which may be at any place or location, to which electric service wires can be installed.

We provide a unit which will furnish warmth and comfort anywhere any time with safety, economy and efficiency.

We provide a heat unit which will be ready to function as soon as the free terminal or cap of the flexible cord set 15 is inserted into the receptacle of the house service wiring.

The function of this embodiment of our invention is now apparent.

Referring to the drawings and considering the electrical embodiment of our invention, when the temperature of the ambient air about the adjustable thermostat 21, is below the desired degree, the various parts will be in such position as to cause the contact points of the relay 20 to be closed and so allow the electric current to flow from the house service wires through the flexible cord 15 to the combination block 17, then via the wire 16 to the terminals 10 of the heat source element 8, thence through the element 8 and the terminal 10 to the relay 20, and through the fuse 19 back to the house service wires.

The energizing of the heat source element 8 causes it to emit heat, which is transmitted through the contact metal 11 to the metal shell of the container structure 1, thence in turn to the chemical 7 disposed uniformly on the inner surfaces of the container 1.

The low heat volatile solid chemical 7 is crystalline at temperatures below 156 degrees Fahrenheit, begins to vaporize at 180 degrees Fahrenheit and attains a temperature of 500 degrees Fahrenheit before pressure is produced, when cycle commences at twenty inches of vacuum, mercury column.

The chemical is introduced into the container structure 1 through the orifice 12 under the condition designated by the letter A on the graph Fig. 7 and as heat is applied and continued the temperatures and pressures follow the curve of the line designated by the letter T on the said graph until the condition designated by the letter B on the said graph is attained, the air in the container structure 1 is now expelled, the heat source discontinued and the pressure reduced until the point designated by the letter C on the said graph Fig. 7 is reached, when the orifice 12 is hermetically sealed. The container 1 is now under vacuum which increases in inches of mercury column as the chemical cools and condenses and the conditions shown by curve of the line R on the graph Fig. 7 are obtained until the point designated by the letter D is reached thus completing the charging cycle. This is the starting or charging condition as shown by the area confined within the lines T, R, Y of the graph Fig. 7 and is standard for the application of this embodiment of our invention to room or space heating. For other conditions the location of the points A, B, C, D may be situated to suit the requirements of industrial or process heating.

The container structure being sealed under partial vacuum and positioned in air below seventy degrees Fahrenheit when the heat source element 8 is energized by the functioning of the thermelectric relay 20—21, the chemical 7, absorbs and stores the heat until the temperature 156 degrees is reached when the latent heat is released and the chemical liquefies, and at 180 degrees vaporizes and the temperatures and pressures designated by the letter F, on the graph Fig. 7 are obtained until the condition designated by the letter H is attained, but due to the proportioning of the container 1, and the secondary surfaces 2, the condition H will not be obtained until the ambient air about the thermostat 21 is at the desired temperature when the heat source is discontinued and the condition G obtained. The operating conditions are as shown by the area within the lines F—G and it will be seen that pressures below atmosphere are at all times maintained, together with safe temperatures.

Figure 8:
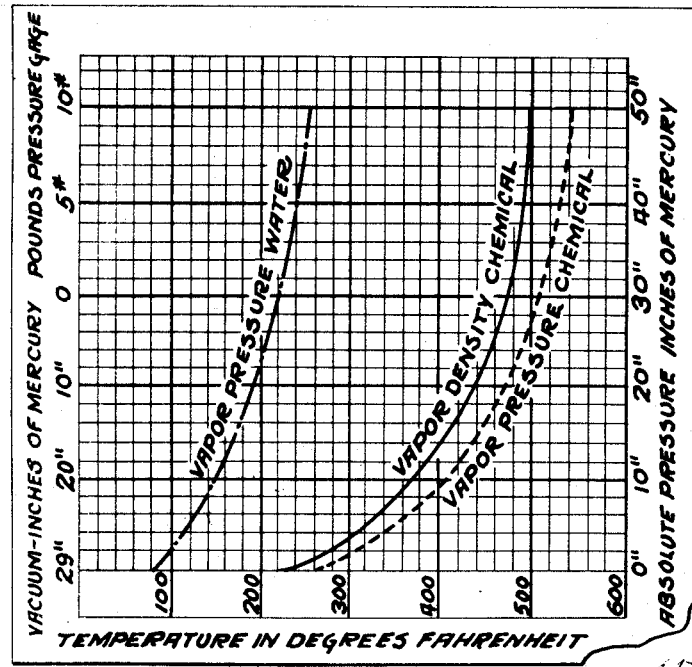
Fig. 8 shows a graph delineating the characteristics of the chemical as compared with water.
Figure 3:
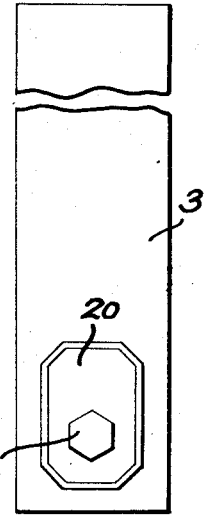
Fig. 3 shows an end view of the same.

Referring to Fig. 8 of the drawings, this graph or chart illustrates the relationship between the vapor pressure density of the low heat volatile solid chemical which we employ as the heat absorbing and transferring means to the comparative temperatures and pressures of water vapor. It is at once apparent from the chart that even at 200 degrees Fahrenheit the water vapor has reached a pressure comparable to that of our vapor pressure when the latter has passed a temperature of 500 degrees Fahrenheit so that it is obvious that a device of this type employing water vapor requires pressure control means as a safety factor to prevent rupture of the structure and other dangerous conditions, as well as means for replacing water at intervals. Furthermore, on account of the uniform condensation of the chemical 7 in crystalline form on the inner surfaces of the container 1, no low point or sump is required in which to collect condensate for reheating and re-evaporation.

Having thus described our invention what we claim and desire to secure by United States Letters Patent is as follows:—

1. An electrical heating device comprising a metallic closed container structure, an electrical heating element external to said container but in contacting relationship therewith, diphenyl within said container under partial vacuum, the heat conducted from said element vaporizing said chemical, said vapor heating the body of the container structure with varying vapor pressures never in excess of atmospheric pressure within a temperature range up to 500 degrees Fahrenheit.

2. An electrical heating device of the type described in claim 1 in combination with means for cutting off the current from said heating element at a predetermined temperature to thereafter permit the release of the latent heat of diphenyl, during the interval of time when it passes through a change of state, to continue to heat the body of said container structure.

3. A device of the type described in claim 1 characterized by the means for discontinuing the current being located at a point in the return circulating path of the air to the structure proper where it will not discontinue said current until substantial utilization of the release of the latent heat of said chemical during its change of state has occurred.

4. An electrical heating apparatus comprising a metallic heat conducting container portion, having a partial vacuum within same, diphenyl oxide $(C_6H_5)(O_2)$ within said container, electrical heating element in external contacting relationship with said container, the vapor of volatilization of said chemical absorbing, transferring and releasing heat derived from said element to said container and thermostatic control means for said element.

5. An electric heating apparatus comprising a metallic heat conducting container portion having a partial vacuum within same, diphenyl within said container, electrical heating element in external contacting relationship with said container, the vapor of volatilization of said chemical absorbing, transferring and releasing heat derived from said element to said container, and means for heating, regulating and controlling thereby a hot water system.

6. An electric heating apparatus comprising a metallic heat conducting container portion having a partial vacuum within same, diphenyl within said container, electrical heating element in external contacting relationship with said container, the vapor of volatilization of said chemical absorbing, transferring and releasing heat derived from said element to said container, and means for heating, regulating and controlling thereby cooking apparatus and utensils.

EDWARD D. BOTTSFORD.
LOUIS T. M. RALSTON.